US007835027B2

(12) United States Patent
Hirabayashi

(10) Patent No.: US 7,835,027 B2
(45) Date of Patent: Nov. 16, 2010

(54) REDUCING THE RESOLUTION OF A RENDERED IMAGE FOR PRINTING

(75) Inventor: Kazunori Hirabayashi, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 868 days.

(21) Appl. No.: 11/424,178

(22) Filed: Jun. 14, 2006

(65) Prior Publication Data

US 2007/0292003 A1    Dec. 20, 2007

(51) Int. Cl.
  *H04N 1/00* (2006.01)
  *H04N 1/60* (2006.01)
  *G06K 15/02* (2006.01)

(52) U.S. Cl. .................. 358/1.2; 358/1.16; 358/1.9

(58) Field of Classification Search ............ 358/1.16, 358/1.2, 1.9; 715/276
  See application file for complete search history.

(56) References Cited

FOREIGN PATENT DOCUMENTS

| JP | 2002-236566 | 2/2001 |
| JP | 2002-127566 | 8/2001 |
| JP | 2003-283855 | 3/2002 |
| JP | 2005-159493 | 11/2003 |

*Primary Examiner*—Benny Q Tieu
*Assistant Examiner*—Eric A Rust
(74) *Attorney, Agent, or Firm*—Patterson & Sheridan, LLP

(57) ABSTRACT

In a case where the remaining capacity of a RAM 12 is small, the resolution of a rendering processing is made smaller than usual. By this, even if the remaining capacity of the RAM 12 is small, banner printing using a long size print sheet P becomes possible.

18 Claims, 6 Drawing Sheets

REDUCING THE RESOLUTION OF A RENDERED IMAGE FOR PRINTING

BACKGROUND OF THE INVENTION

A composite image forming apparatus (called as an MFP) having plural functions such as a copying function, a scan function and a print function can print image data inputted from a network-connected external equipment (for example, a personal computer).

The image data inputted from the external equipment is PDL (Page Description Language) data which a printer (printer engine) of the image forming apparatus can understand.

The image forming apparatus uses a built-in RIP (Raster Image Processor) to convert the PDL data inputted from the external equipment into bitmap format image data which the printer can understand (rendering processing). The bitmap format image data includes image data Y corresponding to a yellow image, image data M corresponding to a magenta image, image data C corresponding to a cyan image, and image data K corresponding to a black image.

As an image forming medium of the image forming apparatus as stated above, there is a long size (also called as a banner size) thin and long print sheet.

However, in the image forming apparatus, the image data for one page is created for each page and is stored in a memory, and the image data for one page in the memory is sequentially supplied to the printer. In the case of so-called as banner printing in which the long size print sheet as stated above is used, since the size of the image data for one page is large, a large capacity memory is required.

However, the memory is used not only in the print function but also in other functions. In the case where the remaining capacity of the memory is small, the banner printing using the long size print sheet becomes impossible.

BRIEF SUMMARY OF THE INVENTION

An object of an embodiment of the invention is to provide an image forming apparatus which can perform printing using a long size print sheet even in the case where the remaining capacity of a memory is small.

An image forming apparatus of an embodiment of the invention has at least a print function and includes a memory for data storage, an analysis section configured to analyze PDL data inputted from outside, a first judgment section configured to judge, based on an analysis result of the analysis section, whether a long size print sheet is required as an image forming medium of the apparatus, a detection section configured to detect a remaining capacity, in a capacity of the memory, usable for storage of print data in a case where a judgment result of the first judgment section is affirmative, a second judgment section configured to judge whether the remaining capacity detected by the detection section satisfies an amount necessary for printing using the long size print sheet, a first calculation section configured to calculate, in a case where a judgment result of the second judgment section is negative, as a resolution of a rendering processing for converting the PDL data into bitmap format image data Y, M, C and K, a maximum value of a resolution at which a total amount of the image data Y, M, C and K can be made to fall within a range of the remaining capacity detected by the detection section, a second calculation section configured to calculate, in a case where the judgment result of the second judgment section is negative, as a resolution of a rendering processing for converting the PDL data into bitmap format image data Y, M and C, a maximum value of a resolution at which a total amount of the image data Y, M and C can be made to fall within the range of the remaining capacity detected by the detection section, an operation section configured to specify a resolution priority mode, a first color conversion section configured to apply a color conversion processing corresponding to a calculation result of the first calculation section to the PDL data in a case where the resolution priority mode is specified by the operation section and the calculation result of the first calculation section is larger than a calculation result of the second calculation section, and in a case where the resolution priority mode is not specified by the operation section and the calculation result of the first calculation section is larger than a previously determined set value, a second color conversion section configured to apply a color conversion processing corresponding to the calculation result of the second calculation section to the PDL data in a case where the resolution priority mode is specified by the operation section and the calculation result of the first calculation section is equal to or less than the calculation result of the second calculation section, and in a case where the resolution priority mode is not specified by the operation section and the calculation result of the first calculation section is equal to or less than the set value, a first rendering section configured to convert the PDL data subjected to the color conversion processing by the first color conversion section into the bitmap format image data Y, M, C and K by a rendering processing corresponding to the analysis result of the analysis section and the calculation result of the first calculation section, a second rendering section configured to convert the PDL data subjected to the color conversion processing by the second color conversion section into the bitmap format image data Y, M and C by a rendering processing corresponding to the analysis result of the analysis section and the calculation result of the second calculation section, a creation section configured to create image data K based on the image data Y, M and C obtained by the second rendering section, and a printer that prints color images respectively corresponding to the image data Y, M, C and K obtained by the first rendering section onto the long print sheet, and prints color images respectively corresponding to the image data Y, M and C obtained by the second rendering section and the image data K created by the creation section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

[1] Hereinafter, a first embodiment of the invention will be described with reference to the drawings.

Figure 1:
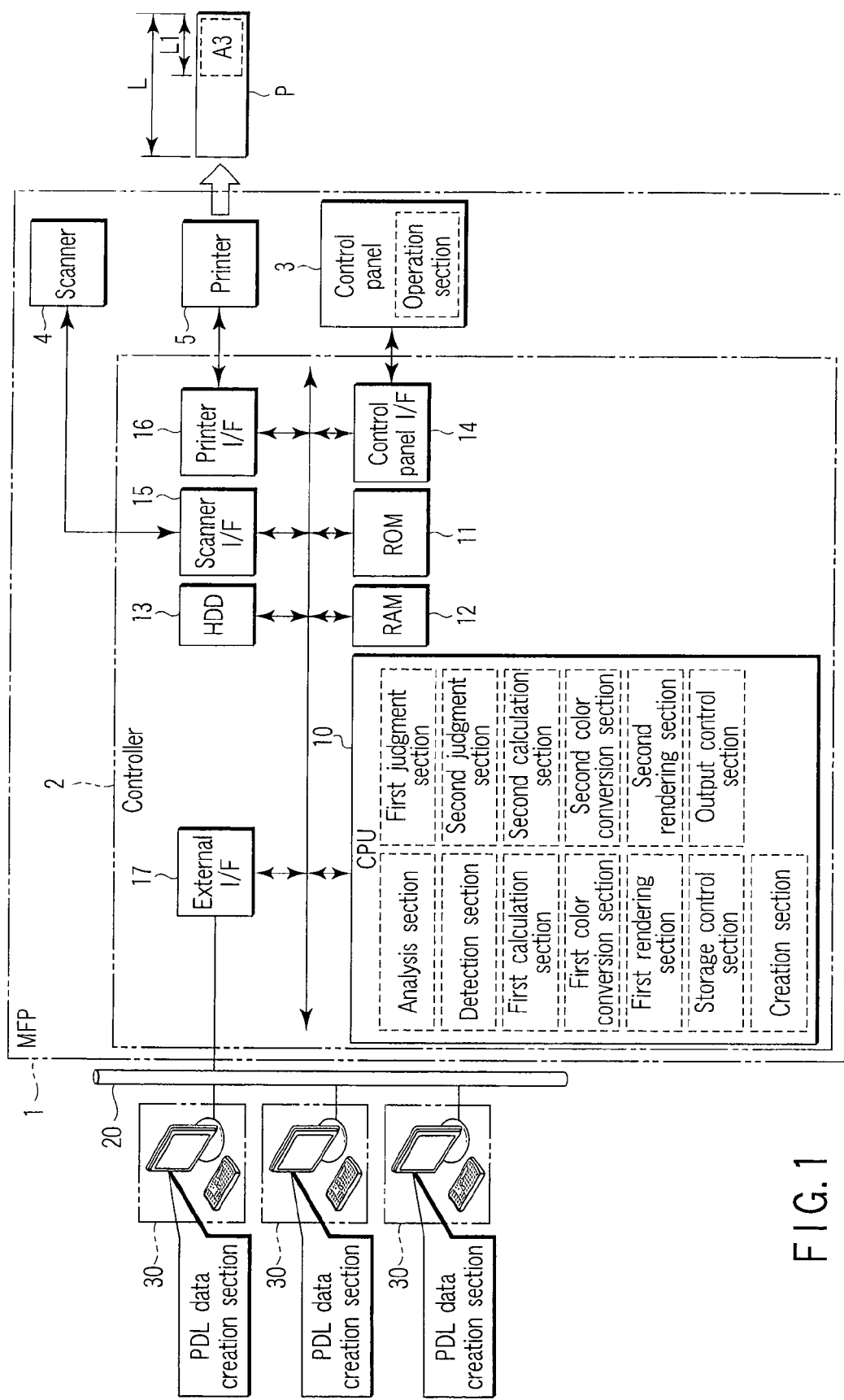
FIG. 1 is a block diagram of a control circuit of a first and a second embodiments.

In FIG. 1, reference numeral 1 denotes a composite image forming apparatus, a so-called as MFP, having plural functions such as a copy function, a scan function and a print function. The MFP 1 includes a controller 2, a control panel 3, a scanner 4, and a printer (also called as a printer engine) 5.

The controller 2 includes a CPU 10 as a main control part, a ROM 11 for program storage, storage means for data storage, for example, a RAM 12, large capacity storage means, for example, a hard disk drive (HDD) 13, a control panel interface (I/F) 14, a scanner interface (I/F) 15, a printer interface (I/F) 16, and an external interface (I/F) 17.

A program of an RIP (Raster Image Processor) is stored in one of the ROM 11 and the hard disk drive 13, and the program is loaded into the RAM 11 at the time of start of the MFP 1 and is executed by the CPU 10. That is, an RIP processing is executed.

The control panel 3 is for setting an operation condition of the MFP 1 and for displaying an operation state of the MFP 1, and includes an operation section for specifying a resolution priority mode relating to the RIP.

The scanner 4 optically reads an image of a document set on the MFP 1. Image data read by the scanner 4 or PDL (Page Description Language) data as image data created by an external personal computer 30 and inputted to the MFP 1 is converted into bitmap format image data Y, M, C and K by the RIP. The image data Y represents a yellow image, the image data M represents a magenta image, the image data C represents a cyan image, and the image data K represents a black image. The printer 5 prints color images respectively corresponding to the image data Y, M, C and K onto a print sheet.

Plural terminals, for example, the personal computers 30 are connected to the external interface 17 through a network cable 20. Each of the personal computers 30 includes a PDL data creation section to create the PDL data by various built-in application programs (word processor, table calculation, presentation, DTP software, etc.). The created PDL data is once spooled in the hard disk drive 13 through the external interface 17, and then is delivered to the RIP processing.

The CPU 10 has following sections (1) to (13) as main functions.

(1) An analysis section that analyzes the PDL data inputted from the personal computer 30.

(2) A first judgment section that judges, based on the analysis result of the analysis section, whether a long print sheet P is required as an image forming medium for the MFP 1. As shown in FIG. 1, the long size print sheet P has a thin and long shape along a sheet discharging direction of the printer 5, and a length L in a longitudinal direction is longer than a length L1 of an A3 size document in the longitudinal direction.

(3) A detection section that detects the remaining capacity, in the capacity of the RAM 12, usable for storage of print data in a case where the judgment result of the first judgment section is affirmative.

(4) A second judgment section that judges whether the remaining capacity detected by the detection section satisfies the amount necessary for the so-called as banner printing using the long size print sheet P.

(5) A first calculation section that calculates, in a case where the judgment result of the second judgment section is negative, as a resolution of a rendering processing for converting the PDL data into bitmap format image data Y, M, C and K, a maximum value (called as maximum resolution) A1 of a resolution at which the total amount of the image data Y, M, C and K can be made to fall within a range of the remaining capacity detected by the detection section.

(6) A second calculation section that calculates, in a case where the judgment result of the second judgment section is negative, as a resolution of a rendering processing for converting the PDL data into bitmap format image data Y, M and C, a maximum value (called as maximum resolution) A2 of a resolution at which the total amount of the image data Y, M and C can be made to fall within the range of the remaining capacity detected by the detection section.

(7) A first color conversion section that applies a color conversion processing corresponding to the maximum resolution A1 to the PDL data in a case where a resolution priority mode is specified by the operation section of the control panel 3 and the maximum resolution A1 is larger than the maximum resolution A2(A1>A2), and in a case where the resolution priority mode is not specified by the operation section of the is control panel 3 and the maximum resolution A1 is larger than a previously determined set value As (A1>As).

(8) A second color conversion section that applies a color conversion processing corresponding to the maximum resolution A2 to the PDL data in a case where the resolution priority mode is specified by the operation section of the control panel 3 and the maximum resolution A1 is equal to or less than the maximum resolution A2, and in a case where the resolution priority mode is not specified by the operation section of the control panel 3 and the maximum resolution A1 is equal to or less than the set value As.

(9) A first rendering section that converts the PDL data subjected to the color conversion processing by the first color conversion section into the bitmap format image data Y, M, C and K by the rendering processing corresponding to the analysis result of the analysis section and the maximum resolution A1.

(10) A second rendering section that converts the PDL data subjected to the color conversion processing by the second color conversion section into the bitmap format image data Y, M and C by the rendering processing corresponding to the analysis result of the analysis section and the maximum resolution A2 and taking after-mentioned creation of the image data K into consideration in advance.

(11) A storage control section that once stores the image data Y, M, C and K obtained by the first rendering section and the image data Y, M and C obtained by the second rendering section into the RAM 12.

(12) An output control section that outputs each of the image data in the RAM 12 when the amount of each of the image data in the RAM 12 reaches a previously determined specific amount.

(13) A creation section that creates, when the respective image data outputted from the RAM 12 are only the image data Y, M and C, image data K based on the image data Y, M and C. Each of the image data Y, M and C includes an element of a black image, and the image data K is created from the element of the black image.

The printer 5 prints color images respectively corresponding to the image data Y, M, C and K outputted from the RAM 12 onto the long print sheet P, and prints color images respectively corresponding to the image data Y, M and C outputted from the RAM 12 and the image data K created by the creation section onto the long print sheet P.

Figure 2:
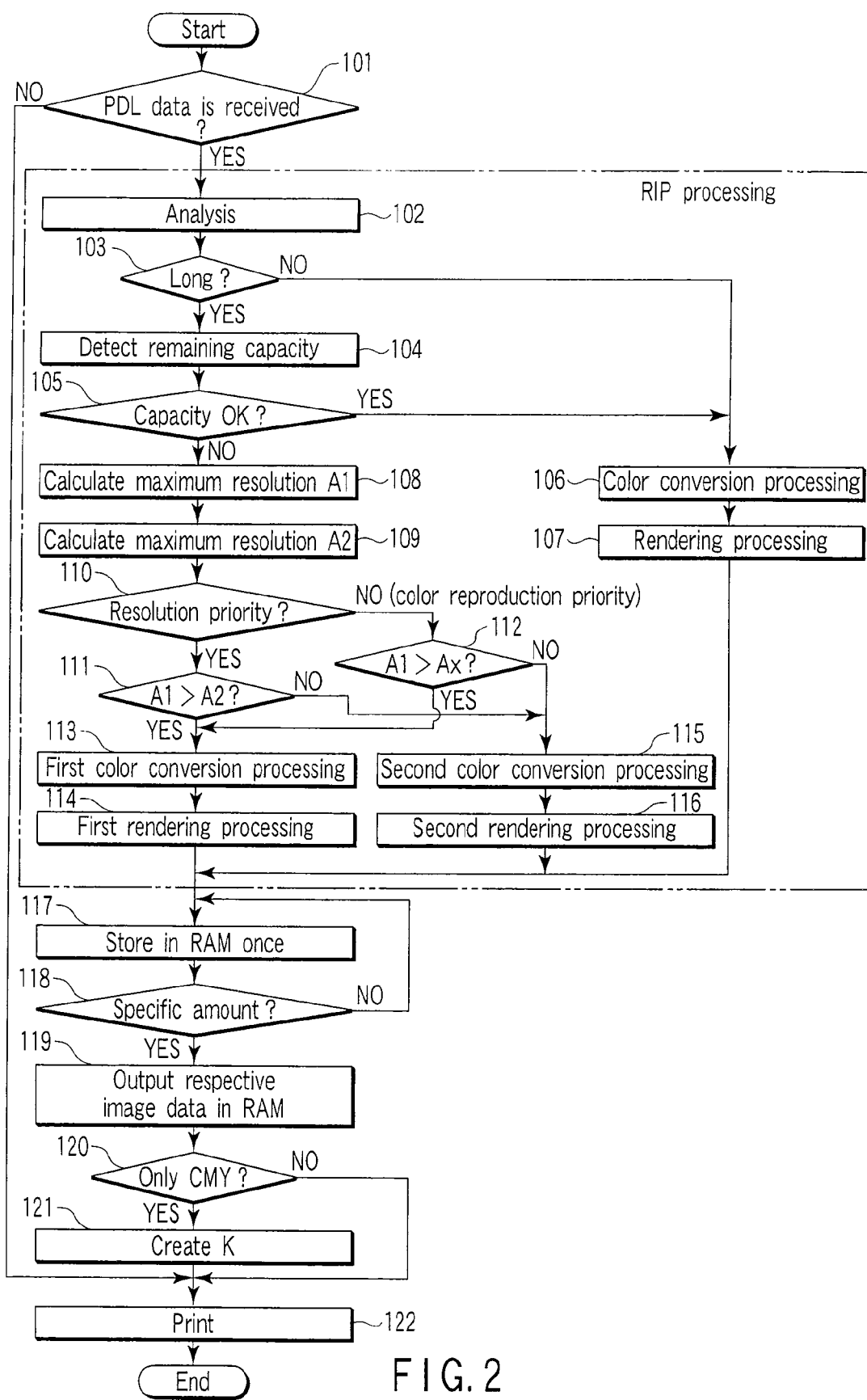
FIG. 2 is a flowchart for explaining an operation of the first embodiment.

Next, the operation will be described with reference to a flowchart of FIG. 2.

When PDL data created in one of the personal computers 30 is inputted to the MFP 1 (YES at step 101), the PDL data is analyzed (step 102). The PDL data includes data to specify the size of a print sheet. This data is analyzed, so that it is judged whether the long size print sheet P is required (step 103).

In the case where this judgment result is affirmative (YES at step 103), the remaining capacity, in the capacity of the RAM 12, usable for storage of print data is detected (step 104). Then, it is judged whether the detected remaining capacity satisfies the amount necessary for the banner printing using the long size print sheet P (step 105).

In the case where this judgment result is affirmative (YES at step 105), the color conversion processing corresponding to a previously determined normal resolution A0 of a rendering processing is applied to the inputted PDL data (step 106). Further, the PDL data subjected to the color conversion processing is converted into the bitmap format image data Y, M, C and K by the rendering processing corresponding to the analysis result and the resolution A0 (step 107). The converted image data Y, M, C and K are once stored in the RAM 12 (step 117). When the amount of each of the image data in the RAM 12 reaches a previously determined specific amount (YES at step 118), the image data Y, M, C and K in the RAM 12 are outputted (step 119).

The outputted image data Y, M, C and K are transferred to the printer 5. The printer 5 prints color images respectively corresponding to the image data Y, M, C and K onto the long print sheet P (step 122).

On the other hand, in the case where the judgment result at step 105 is negative (NO at step 105), as the resolution of the rendering processing for converting the inputted PDL data into the bitmap format image data Y, M, C and K, the maximum resolution A1 at which the total amount of the image data Y, M, C and K can be made to fall within the range of the detected remaining amount is calculated (step 108). Further, as the resolution of the rendering processing for converting the inputted PDL data into the bitmap format image data Y, M and C, the maximum resolution A2 at which the total amount of the image data Y, M and C can be made to fall within the range of the detected remaining amount is calculated (step 109). The maximum resolutions A1 and A2 are smaller than the normal resolution A0 of the rendering processing.

In the case where the resolution priority mode is specified by the operation section of the control panel 3 (YES at step 110) and the maximum resolution A1 is larger than the maximum resolution A2 (A1>A2, YES at step 111), the color conversion processing corresponding to the maximum resolution A1 is applied to the inputted PDL data (step 113). The PDL data subjected to the color conversion processing is converted into the bitmap format image data Y, M, C and K by the rendering processing corresponding to the analysis result and the maximum resolution A1 (step 114).

In the case where the resolution priority mode is specified (YES at step 110) and the maximum resolution A1 is equal to or less than the maximum resolution A2(NO at step 111), the color conversion processing corresponding to the maximum resolution A2 is applied to the inputted PDL data (step 115). The PDL data subjected to the color conversion processing is converted into the bitmap format image data Y, M and C by the rendering processing corresponding to the analysis result and the maximum resolution A2 and taking after-mentioned creation of the image data K into consideration in advance (step 116).

Even in the case where the resolution priority mode is not specified by the operation section of the control panel 3 (NO at step 110, color reproduction priority mode), when the maximum resolution A1 is larger than the previously determined set value As (A1>As, YES at step 112), the color conversion processing corresponding to the maximum resolution A1is applied to the inputted PDL data (step 113). The PDL data subjected to the color conversion processing is converted into the bitmap format image data Y, M, C and K by the rendering processing corresponding to the analysis result and the maximum resolution A1 (step 114).

In the case where the resolution priority mode is not specified by the operation section of the control panel 3 (NO at step 110, color reproduction priority mode), and the maximum resolution A1 is equal to or less than the set value As (NO at step 112), the color conversion processing corresponding to the maximum resolution A2 is applied to the inputted PDL data (step 115). The PDL data subjected to the color conversion processing is converted into the bitmap format image data Y, M and C by the rendering processing corresponding to the analysis result and the maximum resolution A2 and taking the after-mentioned creation of the image data K into consideration in advance (step 116).

Even in the case where the resolution priority mode is not specified, when the resolution is excessively lowered, degradation of print quality is caused, and therefore, the set value As is prepared as a limiting value to the resolution.

The processing of the steps 102 to 116 is the RIP processing.

In the case, for example, 300 dpi is calculated as the maximum resolution A1 of the rendering processing for obtaining the image data Y, M, C and K, and for example, 400 dpi is calculated as the maximum resolution A2 of the rendering processing for obtaining the image data Y, M and C, when the resolution priority mode is specified, the color conversion processing using the maximum resolution A2 and the rendering processing are executed. By this, the image data Y, M, C and K are obtained.

In the case where the resolution priority mode is not specified and the maximum resolution A1 is equal to or less than the set value Ax, the color conversion processing using the maximum resolution A2 and the rendering processing are executed. By this, the image data Y, M and C are obtained. In the rendering processing for obtaining the image data Y, M and C, the occupied area of the respective image data in the RAM 12 becomes small by the absence of the image data K.

The image data Y, M, C and K obtained by the rendering processing or the image data Y, M and C are once stored in the RAM 12 (step 117). When the amount of each of the image data in the RAM 12 reaches a previously determined specific amount (YES at step 118), the image data Y, M, C and K in the RAM 12 or the image data Y, M and C are outputted (step 119).

When the respective image data outputted from the RAM 12 are only the image data Y, M and C (YES at step 120), the image data K is created based on an element of a black image included in the image data Y, M and C (step 121).

The outputted image data Y, M, C and K or the image data Y, M and C are transferred to the printer 5. With this transfer, the created image data K is also transferred to the printer 5.

The printer 5 prints color images respectively corresponding to the transferred image data Y, M, C and K onto the long print sheet P (step 122).

As stated above, since the resolution of the rendering processing is made smaller than usual, even if the remaining capacity of the RAM 12 is small, the banner printing using the long size print sheet P becomes possible.

In the case where the resolution priority mode is specified, since the color conversion processing and the rendering processing are executed using a larger one of the maximum resolutions A1 and A2, it is possible to perform printing with excellent image quality, in which importance is attached to the resolution.

Figure 3:
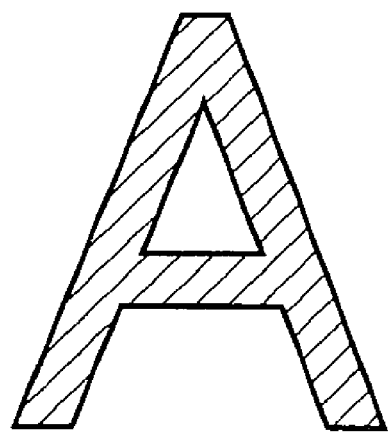
FIG. 3 is a view showing an example of a letter pattern by high resolution printing in the first embodiment.
Figure 4:
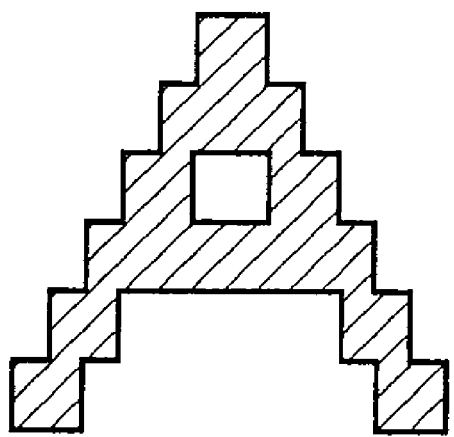
FIG. 4 is a view showing an example of a letter pattern by low resolution printing in the first embodiment.

FIG. 3 and FIG. 4 show an example indicating how a print image changes due to difference in resolution. FIG. 3 shows a letter image printed in the case where the resolution is high, and FIG. 4 shows a letter image printed in the case where the resolution is low. In the case where the letter image is printed, since the sharp contour is obtained when the resolution is high, it is appropriate that the resolution priority mode is specified.

At the rendering processing for obtaining the image data Y, M and C, after the image data Y, M and C are obtained, the image data K is created based on the image data Y, M and C, and therefore, the image data Y, M, C and K can be certainly obtained while the occupied area of the image data in the RAM 12 is reduced. The amount of reduction of the occupied area of the image data in the RAM 12 is about 25% when a calculation is simply performed.

In the rendering processing for obtaining the image data Y, M, C and K, since the image data Y, M, C and K can be transferred to the printer 5 in a state where they are overlapped with each other, application to an advanced processing such as a BOP (Black over Print) processing is possible. In the BOP processing, in the case where different image data is overlapped on image data, the lower image data is not deleted. By performing the BOP processing as stated above, a white patch in an image at the time of printing can be reduced.

[2] A second embodiment of the invention will be described.

In the second embodiment, a following first judgment section is adopted instead of the first judgment section of the first embodiment.

That is, the first judgment section of the second embodiment judges, based on the analysis result of an analysis section, whether a long size print sheet P is required as an image forming medium of an MFP 1, and judges whether the data size of the inputted PDL data is a previously determined standard or more.

Figure 5:
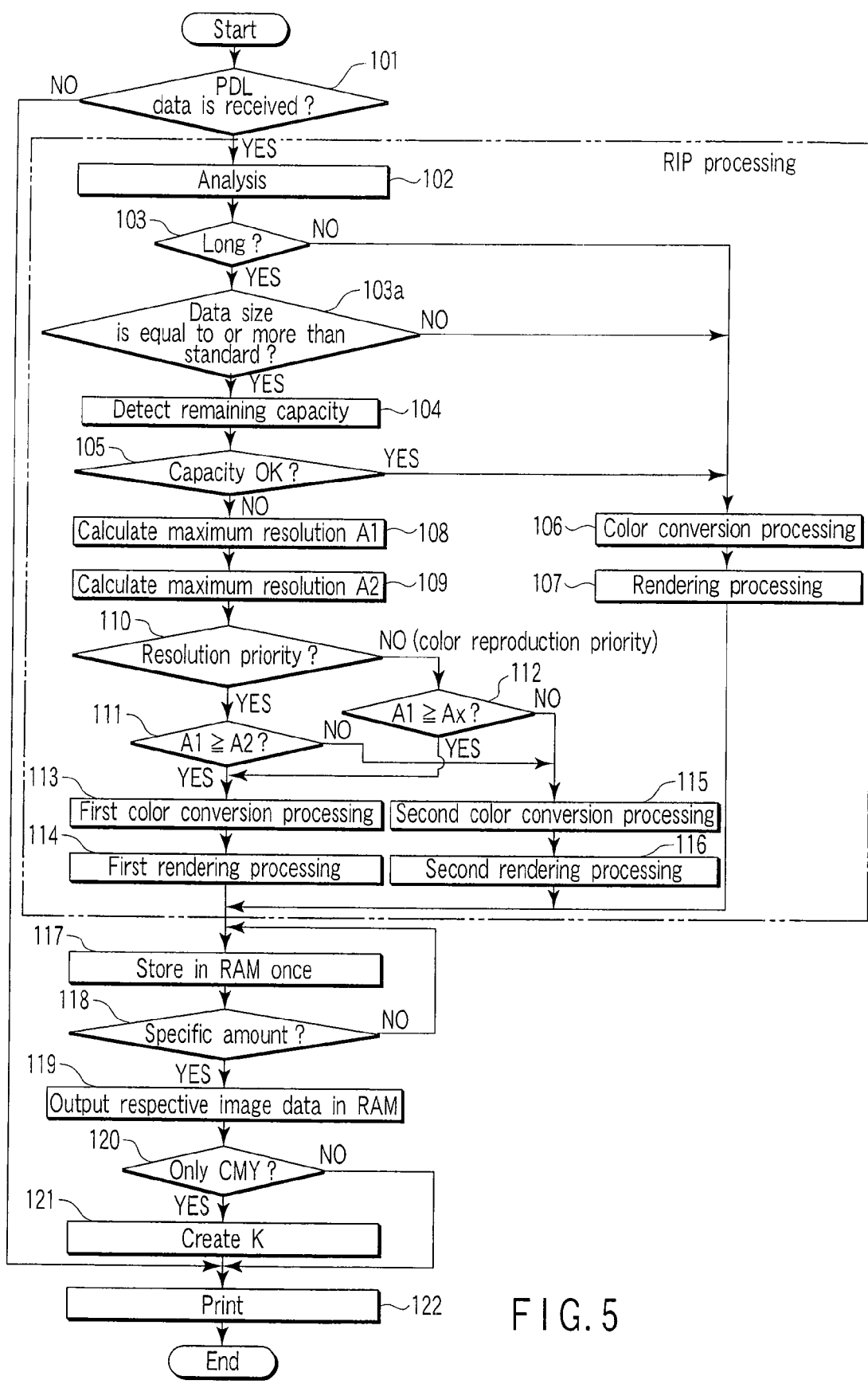
FIG. 5 is a flowchart for explaining an operation of the second embodiment.

That is, as shown in a flowchart of FIG. 5, when PDL data created by one of personal computers 30 is inputted to the MFP 1 (YES at step 101), the PDL data is analyzed (step 102). By this analysis, it is judged whether a long size print sheet P is required (step 103), and it is judged whether the data size of the inputted PDL data is the previously determined standard or more (step 103*a*).

In the case where both judgment results are affirmative (YES at step 103, YES at step 103*a*), the remaining capacity, in the capacity of the RAM 12, usable for storage of print data is detected (step 104).

The other operation and effect are the same as those of the first embodiment. Thus, their description will be omitted.

[3] A third embodiment of the invention will be described.

Figure 6:
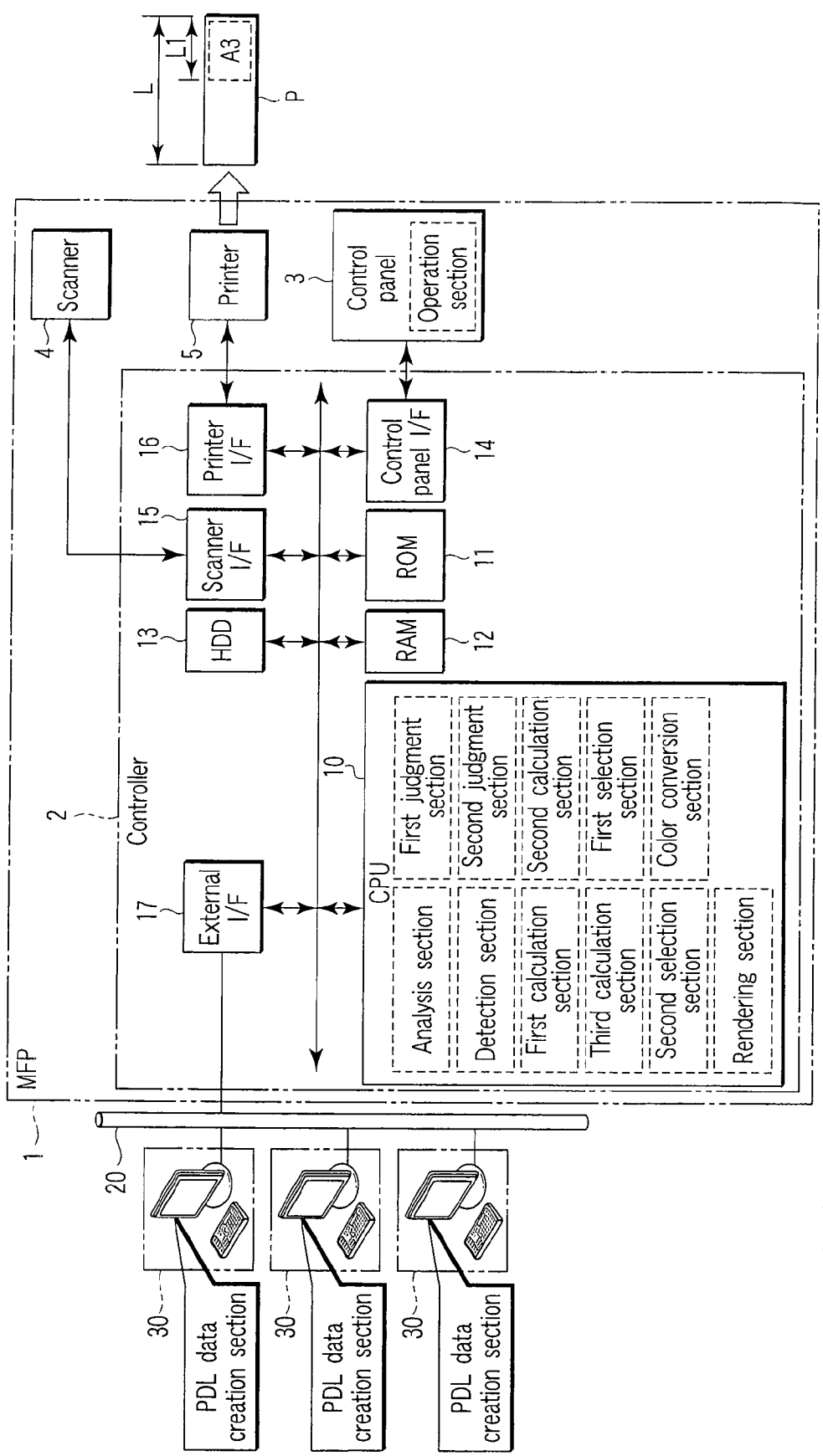
FIG. 6 is a block diagram of a control circuit of a third embodiment.

As shown in FIG. 6, a CPU 10 has following sections (21) to (31) as main functions.

(21) An analysis section that analyzes PDL data inputted from each of personal computers 30.

(22) A first judgment section that judges, based on the analysis result of the analysis section, whether a long size print sheet P is required as an image forming medium of the MFP 1.

(23) A detection section that detects the remaining capacity, in the capacity of the RAM 12, usable for storage of print data in a case where the judgment result of the first judgment section is affirmative.

(24) A second judgment section that judges whether the remaining capacity detected by the detection section satisfies the amount necessary for the banner printing using the long size print sheet P.

(25) A first calculation section that calculates, in a case where the judgment result of the second judgment section is negative, as a resolution of a rendering processing of "N" bits, for example, "8" bits for converting the PDL data into bitmap format image data Y. M, C and K, a maximum value (called as maximum resolution) A1 of a resolution at which the total amount of the image data Y, M, C and K can be made to fall within a range of the detected remaining capacity.

(26) A second calculation section that calculates, in a case where the judgment result of the second judgment section is negative, as a resolution of a rendering processing of "N/n" bits, for example, "4" bits for converting the inputted PDL data into bitmap format image data Y, M and C, a maximum value (called as maximum resolution) A2 of a resolution at which the total amount of the image data Y, M and C can be made to fall within the range of the detected remaining capacity.

(27) A third calculation section that calculates, in a case where the judgment result of the second judgment section is negative, as a resolution of a rendering processing of "N/n" bits, for example, "1" bit for converting the inputted PDL data into bitmap format image data Y, M and C, a maximum value (called as maximum resolution) A3 of a resolution at which the total amount of the image data Y, M and C can be made to fail within the range of the remaining capacity detected by the detection section.

(28) A first selection section that selects a maximum one of the calculated maximum resolutions A1, A2 and A3 in a case where a resolution priority mode is specified by an operation section of a control panel 3.

(29) A second selection section that selects, in a case where the resolution priority mode is not specified by the operation section of the control panel 3, one of the calculated maximum resolutions A1, A2 and A3, which is equal to or more than a previously determined reference value Ax and the number of bits of the corresponding rendering processing is largest.

(30) A color conversion section that applies a color conversion processing corresponding to the selected maximum resolution to the inputted PDL data.

(31) A rendering section that converts the PDL data subjected to the color conversion processing by the color conversion section into bitmap format image data Y, M, C and K by a rendering processing corresponding to the analysis result and the selected maximum resolution and having the number of bits corresponding to the maximum resolution.

The other structure is the same as that of the first embodiment. Thus, its description will be omitted.

Figure 7:
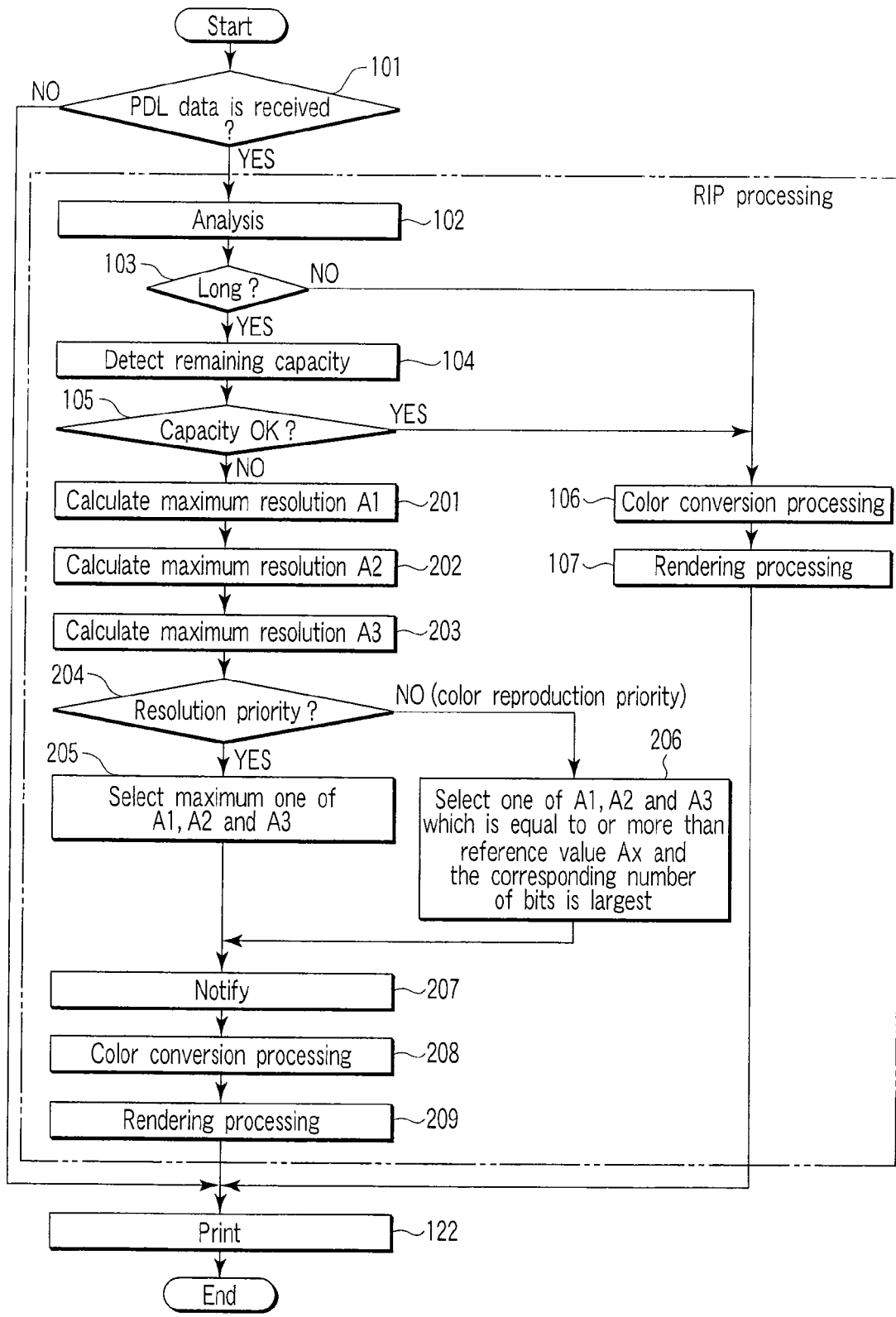
FIG. 7 is a flowchart for explaining an operation of the third embodiment.

Next, the operation will be described with reference to a flowchart of FIG. 7. Incidentally, the same processing as that of the first embodiment is denoted by the same sign.

When PDL data created by one of the personal computers 30 is inputted to the MFP 1 (YES at step 101), the PDL data is analyzed (step 102). By this analysis, it is judged whether the long size print sheet P is required (step 103).

In the case where this judgment result is affirmative (YES at step 103), the remaining capacity, in the capacity of the RAM 12, usable for storage of print data is detected (step 104), Then, it is judged whether the detected remaining capacity satisfies the amount necessary for the banner printing using the long size print sheet P (step 105).

In the case where this judgment result is affirmative (YES at step 105), the color conversion processing corresponding to a resolution A0 of a normal rendering processing of, for example, "8" bits is applied to the inputted PDL data (step 106). Further, the PDL data subjected to the color conversion processing is converted into the bitmap format image data Y, M, C and K by a rendering processing corresponding to the analysis result and the resolution A0 (step 107). The printer 5 prints the color images respectively corresponding to the image data Y, M, C and K onto the long print sheet P (step 122).

On the other hand, in the case where the judgment result at step 105 is negative (NO at step 105), as the resolution of the rendering processing of "8" bits for converting the inputted PDL data into the bitmap format image data Y, M, C and K, the maximum value (called as maximum resolution) A1 at which the total amount of the image data Y, M, C and K can be made to fall within the range of the detected remaining capacity is calculated (step 201).

At the same time, as the resolution of the rendering processing of "4" bits for converting the inputted PDL data into the bitmap format image data Y, M, C and K, the maximum value (called as maximum resolution) A2 at which the total amount of the image data Y, M, C and K can be made to fall within the range of the detected remaining capacity is calculated (step 202).

At the same time, as the resolution of the rendering processing of "1" bit for converting the inputted PDL data into the bitmap format image data Y, M, C and K, the maximum value (called as maximum resolution) A3 at which the total amount of the image data Y, M, C and K can be made to fall within the range of the detected remaining capacity is calculated (step 203).

The maximum resolutions A1, A2 and A3 are smaller than the resolution A0 of the normal rendering processing.

In the case where the resolution priority mode is specified by the operation section of the control panel 3 (YES at step 204), a maximum one of the calculated maximum resolutions A1, A2 and A3 is selected (step 205).

In the case where the resolution priority mode is not specified by the operation section of the control panel 3 (NO at step 204), one of the calculated maximum resolutions A1, A2 and A3, which is equal to or more than the reference value Ax and is largest, is selected (step 206).

With this selection, that the resolution is changed is notified to the user by the display part of the control panel 3 (step 207).

Then, the color conversion processing corresponding to the selected maximum resolution is applied to the inputted PDL data (step 208). Further, the PDL data subjected to the color conversion processing is converted into the bitmap format image data Y, M, C and K by the rendering processing corresponding to the analysis result and the selected maximum resolution and having the number of bits corresponding to the maximum resolution (step 209).

For example, in the case where the maximum resolution A1 is selected, the PDL data subjected to the color conversion processing is converted into the bitmap format image data Y, M, C and K by the rendering processing corresponding to the analysis result and the maximum resolution A1 and having the number of bits "8" corresponding to the maximum resolution A1.

In the case where the maximum resolution A2 is selected, the PDL data subjected to the color conversion processing is converted into the bitmap format image data Y, M, C and K by the rendering processing corresponding to the analysis result and the maximum resolution A2 and having the number of bits "4" corresponding to the maximum resolution A2.

In the case where the maximum resolution A3 is selected, the PDL data subjected to the color conversion processing is converted into the bitmap format image data Y, M, C and K by the rendering processing corresponding to the analysis result and the maximum resolution A3 and having the number of bits "1" corresponding to the maximum resolution A3.

The area where the image data Y, M, C and K obtained by the rendering processing of the number of bits "4" occupy the RAM 12 is ½ of the area where the image data Y, M, C and K obtained by the rendering processing of the number of bits "8" occupy the RAM 12.

The area where the image data Y, M, C and K obtained by the rendering processing of the number of bits "1" occupy the RAM 12 is ⅛ of the area where the image data Y, M, C and K obtained by the rendering processing of the number of bits "8" occupy the RAM 12.

The printer 5 prints the color images respectively corresponding to the converted image data Y, M, C and K onto the long print sheet P (step 122).

As stated above, by changing the number of bits of the rendering processing while the resolution of the rendering processing is held to be at least equal to or more than the reference value Ax, even if the remaining capacity of the RAM 12 is small, the banner printing using the long size print sheet P becomes possible. Since the resolution of at least the reference value Ax or more is used, the print image with sharp contour can be obtained.

In the case where the resolution priority mode is specified, since a maximum one of the maximum resolutions A1, A2 and A3 is used to execute the color conversion processing and the rendering processing, it is possible to perform printing in which importance is attached to the resolution.

Additional advantages and modifications will readily occur to those skilled in the art. Therefore, the invention in its broader aspects is not limited to the specific details and representative embodiments shown and described herein. Accordingly various modifications may be made without departing from the spirit or scope of the general inventive concept as defined by the appended claims and their equivalents.

What is claimed is:

1. An image forming apparatus comprising a processing unit that is programmed with:
   a judgment section configured to judge if a remaining capacity of a memory section for data storage for storage of print data satisfies an amount necessary for printing using a print sheet;
   a first calculation section configured to calculate a maximum resolution at which a total amount of bitmap format image data Y, M, C and K falls within the remaining capacity, if a judgment result of the judgment section is negative;
   a second calculation section configured to calculate a maximum resolution at which a total amount of the image data Y, M and C falls within the remaining capacity; and a first color conversion section configured to apply a color conversion processing corresponding to the calculation result of the second calculation section to PDL data, if the maximum resolution calculated by the first calculation section is equal to or less than a predetermined value.

2. The apparatus according to claim 1, wherein the predetermined value is the maximum resolution calculated by the second calculation section.

3. The apparatus according to claim 1, further comprising:
a second color conversion section configured to apply a color conversion processing corresponding to a calculation result of the first calculation section to the PDL data, if the maximum resolution calculated by the first calculation section is larger than the predetermined value.

4. The apparatus according to claim 3, wherein the predetermined value is the maximum resolution calculated by the second calculation section.

5. The apparatus according to claim 1, wherein the print sheet is a long size print sheet.

6. The apparatus according to claim 1, further comprising:
an operation section configured to specify a resolution priority mode.

7. The apparatus according to claim 6, wherein the predetermined value is the maximum resolution calculated by the second calculation section.

8. The apparatus according to claim 7, wherein the first color conversion section is configured to apply the color conversion processing corresponding to the calculation result of the second calculation section to the PDL data when the resolution priority mode is specified by the operation section, and when the maximum resolution calculated by the first calculation section is equal to or less than the maximum resolution calculated by the second calculation section.

9. The apparatus according to claim 7, wherein the second color conversion section is configured to apply the color conversion processing corresponding to the calculation result of the first calculation section to the PDL data if the resolution priority mode is specified by the operation section, and if the maximum resolution calculated by the first calculation section is larger than the maximum resolution calculated by the second calculation section.

10. The apparatus according to claim 6, wherein the first color conversion section is configured to apply the color conversion processing corresponding to the calculation result of the second calculation section to the PDL data if the resolution priority mode is not specified by the operation section, and if the maximum resolution calculated by the first calculation section is equal to or less than a previously determined set value.

11. The apparatus according to claim 6, wherein
the second color conversion section is configured to apply the color conversion processing corresponding to the calculation result of the first calculation section to the PDL data if the resolution priority mode is not specified by the operation section, and if the maximum resolution calculated by the first calculation section is larger than the previously determined set value.

12. The apparatus according to claim 1 further comprising:
a printer configured to perform a rendering processing for the processed PDL data by the color conversion processing, and print the processed data by the rendering processing onto the print sheet.

13. A control method of an image forming apparatus, comprising:
detecting a remaining capacity usable for storage of print data;
first judging as to whether the detected remaining capacity satisfies an amount necessary for printing using a print sheet;
first calculating a maximum resolution at which a total amount of bitmap format image data Y, M, C and K falls within the remaining capacity, if a judgment result of the first judging is negative;
second calculating a maximum resolution at which a total amount of the image data Y, M and C falls within the remaining capacity; and
applying a first color conversion processing corresponding to the calculation result of the second calculating to PDL data, if the maximum resolution calculated by the first calculating is equal to or less than a predetermined value.

14. The control method according to claim 13, wherein the predetermined value is the maximum resolution calculated by the second calculating.

15. The control method according to claim 13, further comprising:
applying a second color conversion processing corresponding to a calculation result of the first calculating to the PDL data, if the maximum resolution calculated by the first calculating is larger than the predetermined value.

16. The control method according to claim 15, wherein the predetermined value is the maximum resolution calculated by the second calculating.

17. The control method according to claim 13, wherein the print sheet is a long size print sheet.

18. The control method according to claim 13, further comprising:
processing a rendering processing for the processed PDL data by the first color conversion processing; and
printing the processed data by the rendering processing onto the print sheet.

* * * * *